United States Patent [19]
Sieving

[11] Patent Number: 5,302,130
[45] Date of Patent: Apr. 12, 1994

[54] GRAVITY DIFFERENTIAL CONDITIONING FACILITY AND METHOD OF USE

[76] Inventor: David L. Sieving, 15919-A S. Harvard Blvd., Gardena, Calif. 90247

[21] Appl. No.: 909,293

[22] Filed: Jul. 6, 1992

[51] Int. Cl.$^5$ .............................................. G09B 9/00
[52] U.S. Cl. ..................................... 434/55; 434/59; 244/163
[58] Field of Search ............................ 434/55, 59, 30; 244/158 R, 159, 162, 163; 52/65, 30, 236.2

[56] References Cited

U.S. PATENT DOCUMENTS

| | | | |
|---|---|---|---|
| 841,468 | 1/1907 | Tilyou | 52/65 |
| 4,019,292 | 4/1977 | Pedro | 52/65 |
| 4,643,375 | 2/1987 | Allen | 244/162 |

FOREIGN PATENT DOCUMENTS

| | | | |
|---|---|---|---|
| 1078013 | 11/1954 | France | 52/30 |
| 0566458 | 9/1975 | Switzerland | 52/65 |

*Primary Examiner*—Gene Mancene
*Assistant Examiner*—Jeffrey A. Smith
*Attorney, Agent, or Firm*—Monty Koslover

[57] ABSTRACT

A facility for conditioning people for transition between different gravitational environments. The facility comprises a static cylindrical vessel and a revolving cylindrical habitat within the vessel. Within the revolving habitat are supported a number of habitation levels formed or derived from concave-up circular paraboloids, each shaped and sized so as to produce local net acceleration vectors orthogonal to its upper surface. On any one such surface, the local net acceleration magnitudes within a certain band of radii from the axis of revolution of the habitat will approximate that of the native acceleration present in a particular environment, such as Mars or the Earth. Living areas may be constructed on these surfaces, particularly within the target zones. Access to the habitation levels is provided by a central elevator shaft and system. The habitat is supported hydraulically and caused to revolve by hydro-mechanical swirling applied at its bottom surface. The preferred embodiments are designed for installation either on or below the surface of a planetary body.

20 Claims, 3 Drawing Sheets

GRAVITY DIFFERENTIAL CONDITIONING FACILITY AND METHOD OF USE

BACKGROUND AND SUMMARY OF THE INVENTION

This invention relates to an artificial gravity generation system for human habitation in which higher gravities are simulated from within a reduced gravity environment. More particularly, it relates to an artificial gravity system for use in other than zero gravity environments, such as exist on the Moon and on planetary surfaces.

Increasing attention has been given over the history of manned space exploration to the fact that prolonged human exposure to reduced gravity or zero gravity environments results in cumulative physiological degeneration. Results from record-setting stays in orbit by Soviet astronauts have documented effects such as muscle atrophy, bone decalcification and fluid imbalances. The most widely accepted means of treating and preventing such effects is through exposure to artificial gravity.

In the literature of space exploration, including science fiction, various artificial gravity systems are described such as rotating space stations. These systems are designed for use in zero gravity and are therefore not applicable to planetary surfaces. Swinging-arm accelerators for test and conditioning of astronauts are well known, but would be impractical for use in a prolonged conditioning process taking several days, weeks or even months. Such accelerators are of limited capacity and are not designed to accommodate groups of people. Access to and from them requires stopping the rotation of the chamber, and their operation typically requires continual operator attendance and a certain element of physical danger.

Considering a projection of current space technology in the absence of the present invention, astronauts exploring a planetary surface such as Mars or the Moon would have to periodically return to orbit, enter a rotating space station or a rotating transit vehicle to maintain conditioning for Earth gravity, stay several days and finally return to the planetary surface to continue their work. The costs in time and fuel using such a procedure would quickly mount to prohibitive proportions. A need therefore exists for a facility and readily accessible means local to the planetary surface for the treatment of prolonged exposure to reduced gravity.

The invention comprises a static cylindrical containment vessel oriented vertically with respect to its axis of symmetry and a similarly oriented revolving cylindrical habitat within the vessel. Within the revolving inner habitat and attached to its sides, top and bottom are supported a number of habitation levels formed or derived from concave-up circular paraboloids, each shaped and sized in concert with the selected frequency of revolution of the habitat and the ambient vertical acceleration of the service environment so as to produce local net acceleration vectors along their upper/inner surfaces which are orthogonal to these surfaces. A target zone is defined as a band of radii along any one such living surface, taken perpendicularly from the axis of revolution, within which the local net acceleration vectors are within plus or minus ten percent in magnitude of the acceleration magnitude present in one of the target environments the facility is designed to simulate. An astronaut visiting Mars from the Earth for example, would benefit from a target zone in a facility on Mars encompassing plus and minus g/10, where g is the acceleration of gravity at the surface of the Earth. The upper/inner surfaces of the habitation levels may be configured to provide living areas for prolonged residence. Access to, from and between the habitation levels is provided by a central elevator shaft and system. The rotating habitat is supported hydraulically and caused to revolve by hydromechanical swirling applied to baffles on its bottom surface. The entire facility may be installed on the surface or below the surface of a planetary body, or elsewhere as desired for the particular application.

Accordingly, it is a primary object of this invention to provide a gravity differential conditioning facility for groups of humans, for installation in the reduced gravity environment of a planetary body such as Mars or the Moon.

It is another object of this invention to provide a facility for gravity differential conditioning for those visiting or transitioning from any one gravitational environment to any other, natural or artificial.

It is yet another object of this invention to provide physical therapy patients, athletes or other physical trainees with a facility for enhancing or supplementing their conditioning regime or therapy in a higher gravity environment than might otherwise be available.

A further object of this invention is to serve as a unique and educational amusement apparatus.

The attainment of these and related objects may be achieved through the use of the novel facility described herein. Further objects and advantages of the present invention will become apparent from the study of the following portion of the specification, the claims and the attached drawings.

DESCRIPTION OF THE PREFERRED EMBODIMENTS

Figure 1:
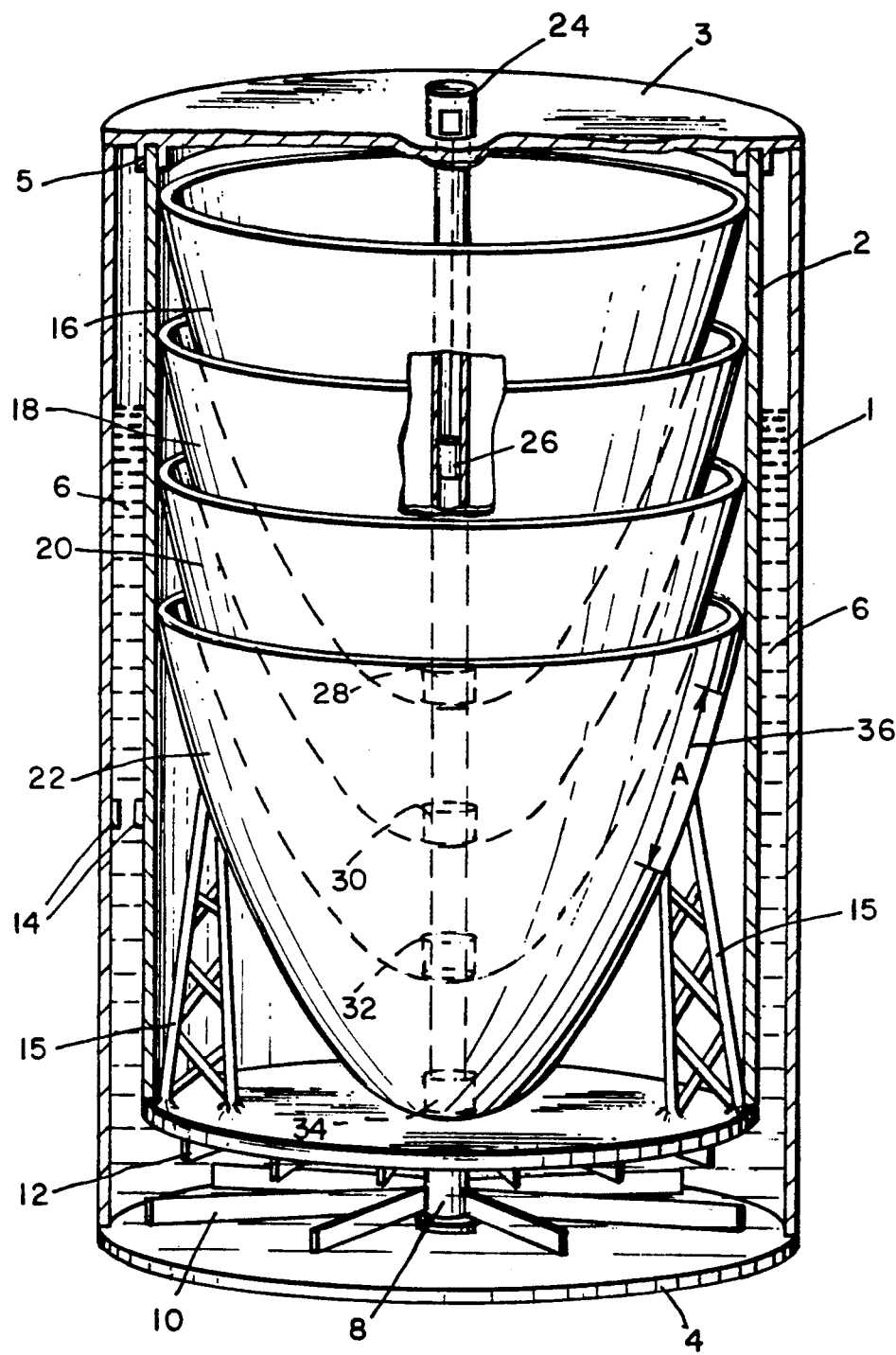
FIG. 1 is a front perspective cut-away view of the present invention facility, particularly showing the relationship of the paraboloid-shaped habitation levels to the revolving cylindrical habitat supporting them.

Referring particularly to the drawings, there is shown in FIG. 1 a preferred embodiment of the gravity differential conditioning facility, herein referred to as the 'GDCF', in accordance with the invention. The perspective view shown is an elevation, with the front portion of the outer vessel 1 and the inner habitat 2 out away to reveal the inner arrangement.

Both the vessel 1 and the habitat 2 are cylindrical in shape. The vessel 1 is static and typically mounted either on or below a given planetary surface such as the Moon or Mars. The revolving habitat 2, and therefore slightly more so the vessel 1 containing it, has a height and diameter sufficient to accommodate one or more Paraboloid-shaped habitation levels 16,18,20,22 of sufficient area and vertical separation for human habitation.

The vessel 1 is constructed from metal or other strong material in a manner similar to that used for large oil or gas storage tanks, with a rigid top cap 3 and base 4. The habitat 2 is similarly constructed, and is supported within the vessel 1 by hydraulic fluid 6 which fills most of the space between the habitat 2 and the vessel 1, and by a pivotal mount 8 at the center bottom. A top cap of the habitat 2 is not shown for the sake of clarity.

A means of guiding the habitat 2 so that it is held concentric with the vessel 1 at all times while permitting it to revolve on its axis is provided by a circular groove 5 in the underside of the vessel top cap 3, and multiple bearings located at intervals circumferentially around the groove. The top rim and part of the walls of the habitat 2 are held between the bearings in the groove 5, allowing easy rotational movement.

In service, the habitat 2 is rotated about its axis of symmetry at a selected frequency of revolution related to the shape of the habitation levels and the magnitude of the ambient vertical (e.g. gravitational) acceleration present in the service environment. This is achieved by means of a motor driving and rotating an array of blades 10 attached to the pivotal mount 8 at the center bottom 4 of the vessel 1. An array of baffles 12 is attached radially to the underside of the bottom of the habitat 2. These baffles 12 are impinged by the swirling hydraulic fluid 6 which is moved by the blades 10, causing the habitat 2 to revolve on its pivotal mount 8.

Electronic frequency sensors 14 attached to the inner surface wall of the vessel 1 and the outer surface wall of the revolving habitat 2 monitor the frequency of revolution of the habitat 2. The frequency sensors 14 transmit signals to the controls for the motor driving the swirling blades 10, which adjusts the blade rotation speed as needed to maintain the selected frequency of revolution of the habitat 2.

Within the habitat 2, attached to its walls and supported by structural members 15 are located a number of habitation levels 16, 18, 20 and 22, which are arranged at intervals down the walls of the habitat 2. In the illustration of FIG. 1, four habitation levels are shown, each separated from the next by about 25 meters as measured vertically. However, this number, diameter, specific shape and vertical separation of habitation levels was chosen purely as an example for diagrammatic clarity, and a different number and arrangement of levels may be chosen depending on considerations of overall facility height, the parabolic acuteness of the habitation levels and on the desired vertical clearance for the living surfaces of the habitation levels beneath the topmost one.

Each habitation level 16, 18, 20, 22, has a concave-up circular paraboloid shape and overall diameter which, taken together with the selected frequency of revolution of the habitat 2 and the magnitude of the ambient vertical acceleration present in the service environment, are sufficient to approximate a given target gravity acceleration such as Earth-normal gravity over an area of its upper/inner living surface. Note that a GDCF may be designed with a range of accelerations sufficient to service more than one target environment.

This configuration of habitation levels is considered to be the 'basic' design because it forms the mathematical, structural and mechanical basis for each of the variants described herein. For a given facility, the shape of each habitation level and the designated frequency of revolution of the habitat 2 are chosen in coordination with one another such that the combined effects of the centripetal acceleration produced by the revolution of the habitat 2 about its axis of symmetry and the ambient vertical (e.g. gravitational) acceleration present in the service environment result in local net acceleration vectors over the entirety of the upper/inner surface of the habitation level which are orthogonal (or nearly orthogonal) to that surface.

In operation therefore, a certain equivalent gravity force will be present perpendicular to the living surface at all locations on the habitation level. The magnitude of the simulated gravity force will vary with the radial distance from the axis of revolution, increasing with increase radius.

Structural members 15 of conventional design support the habitation levels from the habitat 2 and from one level to the next as needed. Only two such members 15 are depicted in FIG. 1. The others are omitted for the sake of clarity.

A means of access to and between the habitation levels is provided by a central elevator system 24 which includes an elevator car 26, means for operating and lifting the car, and a shaft which is located along the central longitudinal axis of the facility.

The elevator car 26 stops at stations 28, 30, 32, 34 on each habitation level. Ingress to and egress from the GDCF is accomplished through the upper end of the elevator shaft, which extends above the top surface 3 of the facility.

The elevator shaft may be fixed to the habitation levels and thus rotate with them, being recessed outward at the elevator stops or stations 28, 30, 32, 34 located at the vertex of each habitation level so as to ease the transitions by facility users between the elevator and the habitation levels, particularly when the elevator is not designed such that the car 26 rotates along with the habitat 2. The elevator car 26 may, however, be revolving in sync with the habitation levels. This can be achieved by having the conventional lifting mechanism, which is situated above the top 3 of the vessel 1, fixed to the rotating elevator shaft.

In facilities of large diameter, where the same target zones are created with lower habitat revolution frequencies, the relatively slow rotation speed of the elevator car and shaft would make embarking and debarking the car at the top of the GDCF, or at the elevator stops using a non-rotating elevator car, about as manageable as getting on and off an escalator.

In facilities of small diameter, where higher habitat revolution frequencies are required, the elevator can be designed such that the car 26 is rotated in sync with the habitat at the habitation level access stations, and despun at the facility entry/exit station at the top of the shaft. This can be achieved using a pivoting joint for the attachment of the cable to the car 26. The car 26 may then be spun up through mechanical contact with the elevator shaft and despun through the removal of the contact.

The elevator shaft may also be fixed to the static vessel 1 and thus not attached to the habitation levels, comprising a simpler albeit less flexible elevator design.

The habitation levels 16, 18, 20 and 22 must be sized and shaped in coordination with the selected frequency of revolution of the habitat 2 and the magnitude of the ambient vertical acceleration present in the service environment so as to create the desired target zone or zones over large enough areas of the living surfaces to meet the needs of the intended users of the facility, and to achieve the desired overall facility and target zone spatial capacity.

Human habitation requirements such as eating, sleeping and exercise facilities are examples of possible considerations in the facility and habitat design process. The radial component 'A' of a target zone 36 is indicated for the lowermost habitation level 22 in FIG. 1. A given target zone encompasses a band of radii along the living surface of a GDCF habitation level within which the magnitudes of the local net acceleration vectors approximate the native acceleration present in the corresponding target environment. Its area therefore extends completely around the upper/inner surface of the habitation level.

In the embodiment depicted in FIG. 1, designed for the surface of Mars, Earth normal gravity is approximated to within + and −10% by the indicated target zone. Since all of the habitation levels in the FIG. 1 embodiment have the same size and shape, the same target zone area 'A' is present on each of the habitation levels within the same band of radii.

As an illustration of the parameters and characteristics of a GDCF, the following example calculations are presented in connection with the embodiment shown in FIG. 1;

Given:

| | |
|---|---|
| Service environment | = surface of Mars |
| Ambient vertical gravity acceleration | = 3.72666 m/s/s |
| Target environment | = surface of Earth |
| Target area vertical gravity accel. at Earth | = 9.807 m/s/s |
| Habitat revolution frequency | = 0.0644 revs./sec |
| Corresponding habitat rpm | = (3.864 rpm) |

The shape of the habitation levels in this or any GDCF is based on a concave-up paraboloid of revolution whose upper/inner surface is characterized by the polar function $$b(r) = 2\pi^2 r^2 w^2/a \quad \text{(Eqn. 1)}$$

where b(r) = altitude at radius r of the living surface of a habitation level above an imaginary basal plane tangent to the vertex of the living surface, meters;.
r = radius taken perpendicularly from the axis of habitat revolution at any point on the living surface, meters;
w = habitat revolution frequency, cycles/sec.
a = magnitude of service environment ambient vertical acceleration, meters/sec².

The following equations are derived from Eqn. 1, but may be derived independently for corroboration:

Slope of living surface at any radius r, b'(r) taken relative to basal plane tangent to vertex of the living surface.

$$b'(r) = 4\pi^2 r w^2/a \quad \text{(Eqn. 2)}$$

Magnitude of local net Acceleration vector at radius r, A(r):

$$A(r) = \text{sqrt}\,[a^2 + 16(\pi^4 r^2 w^4)] \quad \text{(Eqn. 3)}$$

Direction of local net Acceleration vector A(r), A'(r)

$$A'(r) = -a/[4\,(\pi^2 r w^2)] \quad \text{(Eqn. 4)}$$

Using equations 2, 3 and 4, the magnitude and direction of the local net acceleration vectors, as well as the local slope of the living surface, are computed for five selected radii. The results are tabulated in Table 1 below.

TABLE 1

| | ACCELERATION AND SLOPE Vs RADIUS | | |
|---|---|---|---|
| Radius r m | Accel. A(r) Magnitude, m/sec/sec | Accel. A'(r) Direction m/vert/m hor. | Surface Slope b'(r) m vert/m hor. |
| 1. 0 (vertex) | 3.7266 | −infinity | 0.0 |
| 2. 39.423 | 7.4533 | −0.577 | 1.732 |
| 3. 48.866 | 8.8263 | −0.4657 | 2.1469 |
| 4. 55.404 | 9.807 | −0.4108 | 2.4342 |
| 5. 61.83 | 10.787 | −0.3681 | 2.7165 |

Referring to Table 1, the slope b'(r) of the living surface at each selected radius r is the negative inverse of the slope A'(r) of the local net acceleration vector. This demonstrates that the local net acceleration vector is orthogonal to the living surface 36 at each radius, as required for practical use of the habitation levels.

From Table 1, note that the Earth-normal target gravity acceleration of 9.807 m/sec/sec is achieved at radius 4, 55.404 meters from the axis of revolution. A GDCF on the surface of Mars using the selected revolution frequency would therefore need habitation levels at least 110.808 meters in diameter in order to provide an accurate simulation of Earth-normal gravity. If a smaller diameter is desired, the revolution frequency w is increased as necessary, resulting in habitation levels whose paraboloid shape is more acute and compact in accordance with Equation 1.

Note also that radius 4 in Table 1 was selected such that A(r) is equal to the Earth-normal acceleration of 9.807 m/sec/sec or 1g, and that radii 3 and 5 respectively have A (4) values of g− g/10 and g+ g/10. Radii 3 and 5 thus delineate an 'Earth zone' for this GDCF within which Earth-normal gravity is simulated to within plus and minus 10%. Solving Equation 1 at radius 5, the altitude b(r) of the living surface above the imaginary basal plane tangent to the vertex at this radius is approximately 84 meters.

A GDCF configured as shown in FIG. 1 with a single habitation level would therefore require an overall facility height of 84 meters plus an allowance for the hydraulic support and drive mechanism above and below the habitat, as well as the containment vessel. If more than one habitation level is installed, the habitat height progression for each added level is a simple linear one, equal to the desired vertical clearance between levels plus the thickness of the added level.

Design calculations for a GDCF having the basic habitation level configuration shown in FIG. 1 with four levels result in the following dimensions for a Mars surface facility:

Overall facility height = 177 meters

Overall facility diameter = 140 meters

Approx. total target (Earth) zone area = 46,889 sq. meters.

The embodiment shown in FIG. 1 is somewhat visionary in scale, however, and higher habitat revolution frequencies can always be used to construct much smaller GDCFs which would be more easily included in the payload roster of a planetary mission, and more easily assembled in the service environment by a small team of astronauts.

A GDCF may be constructed, assembled and operated using conventional equipment, methods and materials. Other than the requirement to maintain the integrity of the habitat and/or containment vessel against an outer vacuum or low pressure atmosphere when the facility is installed in such an environment to maintain a suitable atmosphere inside the habitat, the engineering and structural requirements may be considered routine.

In using a GDCF, an individual requiring preconditioning for an anticipated transition from one gravitational environment to another will visit an appropriate GDCF in service in the environment having the weaker of the two gravities. This is because a GDCF provides gravities equal to or greater than the ambient vertical acceleration present in the service environment.

The user enters the facility from the top 3 by way of the central elevator 24, and rides the elevator car 26 down to the station 28 at the vertex of the first habitation level 16, or down to other levels. After using the habitation level, the individual may visit other habitation levels or exit the facility by way of the elevator.

The process method of conditioning or other facility usage depends on whether the user is:
1) transferring *from* an environment of weaker gravity to an environment of stronger gravity; or
2) transferring *to* an environment of weaker gravity from an environment of stronger gravity; or
3) *visiting* an environment of weaker gravity, either from or en route to an environment of stronger gravity; or
4) undergoing physical therapy, athletic conditioning or other physical training not necessarily related to space travel; or
5) engaging in amusement or educational activities or experimentation.

For case 1), transferring from a weaker gravity environment to a stronger gravity environment, the process steps are as follows:

(a) entering the facility, proceeding to a habitation level and remaining near the vertex area for a short time;

(b) moving out to a radial zone of incrementally higher local net acceleration magnitude and remaining there for a designated period, exercising and resting;

(c) moving gradually outward from the vertex area through zones of increasing local net acceleration magnitude, stopping at each zone for a designated period of exercise and rest until reaching the target zone corresponding to the target or destination environment's native acceleration;

(d) remaining at the target zone, exercising and resting until judged physiologically ready for transition to the target environment;

(e) exiting the habitation level and the facility.

For case 2), transferring *to* an environment of weaker gravity from an environment of stronger gravity, the process steps after arriving at the weaker gravity environment are as follows:

(a) entering the facility, proceeding to a habitation level and moving directly outward from the vertex of the habitation level to the target zone corresponding to the stronger gravity environment of origin, remaining there for a designated time period, exercising and resting;

(b) moving gradually inward through zones of decreasing local net acceleration magnitude toward the vertex of the habitation level, stopping at each zone for a short period, exercising and resting;

(c) entering the vertex area of the habitation level and remaining there, exercising and resting until comfortable in, and/or judged physiologically ready for transition to the external native gravity environment;

(d) exiting the habitation level and the facility.

For case 3), *visiting* an environment of weaker gravity, either from or en route to an environment of stronger gravity, the process steps after arriving at the environment of weaker gravity are as follows:

(a) entering the facility, proceeding to a habitation level and moving gradually or directly, depending on the user's relative existing level of physiological adaptation, outward from the vertex of the level to the target zone corresponding to the environment of origin or of subsequent destination, remaining there for a designated time period, exercising and resting;

(b) taking up residence in the target zone corresponding to the gravity environment of origin or of subsequent destination;

(c) moving gradually inward through zones of decreasing local net acceleration magnitude toward the vertex of the habitation level, stopping at each zone for a short period, exercising and resting;

(d) entering the vertex area of the habitation level and remaining there, exercising and resting until comfortable in and/or judged physiologically ready for transition to the external native gravity environment;

(e) periodically exiting the habitation level and the facility if necessary for the purpose of the visit;

(f) periodically returning to the facility and a target zone corresponding to the stronger gravity environment of origin or of subsequent destination for meals, sleep, exercise and leisure activities;

(g) quitting residence in the facility and proceeding to the stronger gravity environment of origin or of subsequent destination.

For case 4), undergoing physical therapy, athletic conditioning or other physical training not necessarily related to space travel, the process steps are as follows:

(a) entering the facility, proceeding to a habitation level and moving gradually or directly, depending on the user's relative existing level of physiological adaptation, outward from the vertex of the level to a target zone within which the magnitudes of the local net acceleration vectors are appropriate for the desired therapy, conditioning or training regimen;

(b) remaining in said target zone for a designated period, exercising and resting;

(c) exiting the habitation level and the facility:

(d) periodically returning to the facility and an appropriate target zone for continued therapy, conditioning or training as prescribed by the user's physician or trainer.

For case 5), engaging in amusement or educational activities or experimentation, the process steps are as follows:

(a) entering the facility and exploring the living surfaces of its habitation levels;

(b) performing experiments related to the gravitational characteristics of the facility environment, or pertaining to the effects of increased acceleration magnitudes on natural or artificial systems or processes;

(c) exiting the habitation levels and the facility,

To summarize, a GDCF would provide a means of gradual acclimation to a stronger or weaker gravitational environment; it would provide a means of maintaining one's physiological adaptation to a stronger gravitational environment while visiting a weaker gravitational environment; it would provide a means of treating and preventing the cumulative physiological maladies associated with long-term residence in reduced gravity environments; it would provide a novel means of enhancing or supplementing physical therapy and athletic conditioning; and it would serve as a unique facility for amusement, education or experimentation.

Among the process methods described above, only the first, in which a user acclimated to a weaker gravitational environment uses a GDCF to condition for a stronger, derives a distinct benefit from the provision of a continuous, unbroken gradient of local net acceleration magnitudes between the vertex of a habitation level and the target zone of interest. The objectives of the remainder of the process methods are as readily attainable even when there are steeper radial steps of acceleration magnitude between the vertex and the target zone. Habitation levels designed with the latter objectives in mind may employ terracing to economize on the total vertical dimension of each level without sacrificing target zone area.

Figure 2:
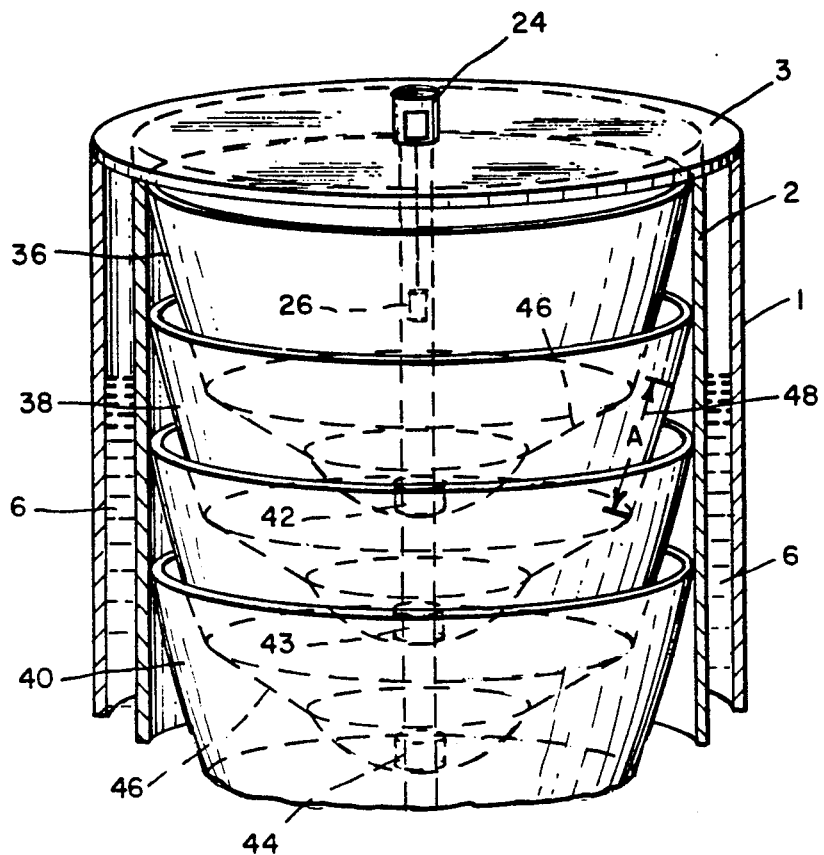
FIG. 2 is a front perspective cut-away view of the top portion only of the present invention, particularly showing an alternate terraced paraboloid shape for the habitation levels.

FIG. 2 shows a portion of an alternate GDCF embodiment where terracing 46 of the habitation levels 36, 38, 40 has been used to collapse each habitation level vertically, thereby reducing its overall height. This design is called "conic terraced" after the circular conic sections used for the terraces. Only one terrace per habitation level is shown in FIG. 2 for the sake of clarity, although more may in general be present. In particular, terraces 46 may be placed between the vertex and the first target zone 48 as shown in FIG. 2, and additionally between successive target zones when multiple target zones (not shown) are provided by a given habitation level. All other aspects of the embodiment of FIG. 2 are the same as described earlier for the basic GDCF embodiment, including the top cap of the habitat 2, which is not shown for the sake of clarity.

In using a conic terraced GDCF, an individual enters the facility from the top 3 using the central elevator 24 to access a habitation level. Supposing the first habitation level 36 is selected, the elevator car 26 stops at the station 42, where the user debarks. Proceeding outward from the vertex along the living surface, the user experiences a continuous, graded increase in the local net acceleration magnitude with increased radius from the axis of revolution of the habitat 2. The direction of the local acceleration remains orthogonal to the living surface until the inner edge of the terrace 46 is reached. The terraced section 46 of the habitation level is formed from a circular conic section, and therefore has no curvature along its radial aspect. Since it therefore does not follow the change with radius in the direction of the local net acceleration vectors, pedestrians and vehicles traversing the terrace radially will perceive it as a geometrically linear incline which seems to get steeper as one moves away from the vertex towards the target zone area 46 marked 'A'. The maximum apparent steepness at the outer edge of the terrace imposes a potentially inconvenient limitation on the median or overall steepness of the terraces 46 relative to the adjacent non-terraced portions of the living surface.

The definitive solution of this difficulty is to introduce a radial curvature into the terraces 46 such that their apparent steepness does not vary with radius. A polar function is calculated whose derivative with respect to radius is less by a constant amount than the derivative $b'(r)$ (Equation 2) of $b(r)$ (Equation 1). Circular sections of the resulting pseudohyperboloid are used to define the terraces. Because the concave-up curvature of such terraces is generally slight, their appearance as designed for the embodiment of FIG. 2 is nearly identical to the conic terraces shown. This is the "pseudohyperbolic terraced" design, and is the preferred design for terraces in a GDCF. The mathematical tractability of this solution should be apparent to those skilled in the art, and the calculations are therefore omitted for the sake of brevity.

Design calculations for a GDCF having the terraced design shown in FIG. 2 with five levels result in the following dimensions for a Mars surface facility when the habitat revolution frequency, vertical level separation and target zone coverage per level are the same as those in the embodiment of FIG. 1:

| Overall facility height: | 177 meters |
|---|---|
| Overall facility diameter: | 140 meters |
| Approx. total target (Earth) zone area: | 58,611 m$^2$ |

The same figures are obtained for an otherwise similar facility having the pseudohyperbolic terraced design. Note that the total facility target zone area has been increased by 25% over that for the embodiment of the basic design shown in FIG. 1. This results from the fact that five terraced levels may be fit into the same habitat that can accommodate only four levels having the basic design using the same vertical level separation. For any given facility, therefore, a greater number of terraced habitation levels may be installed within a given vertical segment of the habitat than non-terraced levels. The total area of a given target zone or zones provided by such a facility is greater than that of its non-terraced analog by the number of extra levels afforded times the total area of the specified target zone or zones provided by each of the extra levels. More efficient use is therefore made of the internal volume of the habitat 2. Access between levels is achieved using the central elevator 24, with stations 42, 43, 44 at the vertex of each level.

Other than as shown and described, all of the construction, operation and usage details for a GDCF having the conic terraced design shown in FIG. 2 or the nearly identical pseudohyperbolic terraced design are the same as those discussed earlier for the basic GDCF design.

Figure 3:
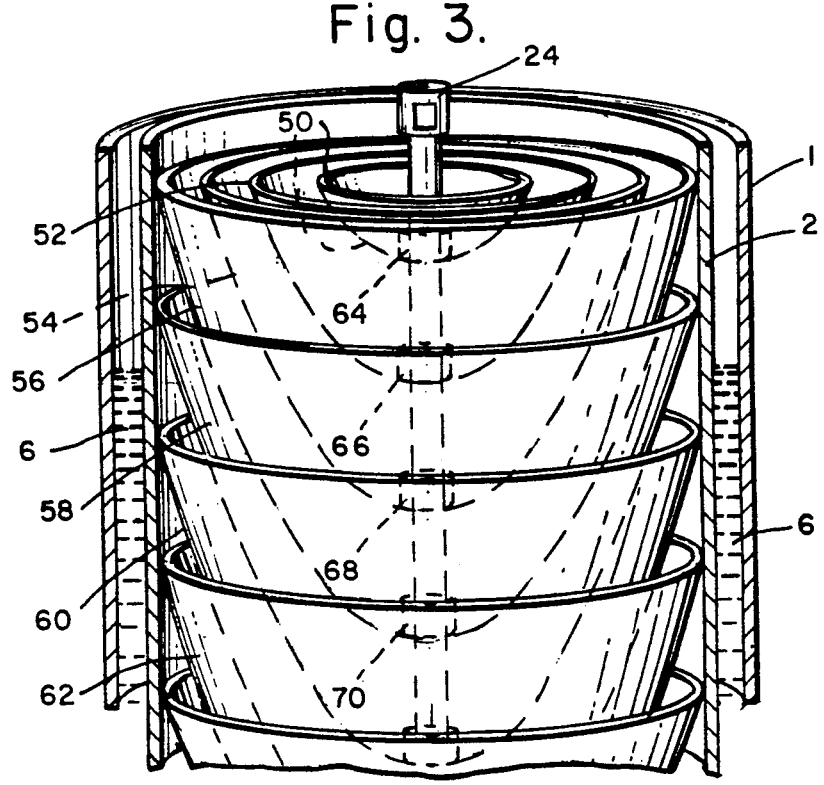
FIG. 3 is a front perspective cut-away view of the top portion only of the present invention with the top cap and covers removed for clarity, particularly showing an optional series of progressively- sized or phased habitation levels between the uppermost full-sized level and the top of the habitat.

Referring now to FIG. 3, there is shown a front elevation cut-away view of the top portion of a GDCF having another alternate habitation level design. This design differs from the basic design of FIG. 1 only in the addition of successively smaller habitation levels 54, 52, 50 within the open space that would otherwise exist above the uppermost full-sized habitation level 56. These additional habitation levels 54, 52, 50 are anchored to the top cap (not shown) of the habitat 2 rather than to its sides, since they do not span the diameter of the habitat 2. This "phased" arrangement of habitation levels makes more practical use of the space above the uppermost full-sized habitation level 56, and may be used in conjunction with the basic design (as shown), the conic terraced or the pseudohyperbolic terraced GDCF designs. It also simplifies the restriction of access to higher-gravity target zones, which at any given time may be physiologically unsafe for certain of the facility's occupants. Such occupants would be granted access only to those of the phased habitation levels 50, 52, 54 lacking target zones for which they are physiologically unprepared.

Design calculations for a GDCF having the phased design shown in FIG. 3 with seven levels (4 full-sized levels 56, 58, 60, 62 and 3 phased levels 54, 52, 50) result in the following dimensions for a Mars surface facility when the habitat revolution frequency, vertical level separation and target zone coverage per full-sized level are the same as those in the embodiment of FIG. 1:

| Overall facility height: | 177 meters |
| Overall facility diameter: | 140 meters |
| Approx. total target (Earth) zone area: | 50,798 m$^2$ |

Note that the total facility target zone area has been increased by about 8.34% over that for the embodiment of the basic design shown in FIG. 1. This is due to the successively smaller fractions of target zone area provided by the phased levels, the smallest of which may not contribute any target zone area. More efficient use is therefore made of the space above the uppermost full-sized level, and therefore of the total internal volume of the habitat. In the embodiment of FIG. 3, access between levels is achieved using the central elevator 24, with stations 64, 66, 68, 70 at the vertex of each level.

Other than as shown and described, all of the construction, operation and usage details for a GDCF having the phased design shown in FIG. 3 are the same as those discussed earlier for the basic GDCF design.

Figure 4:
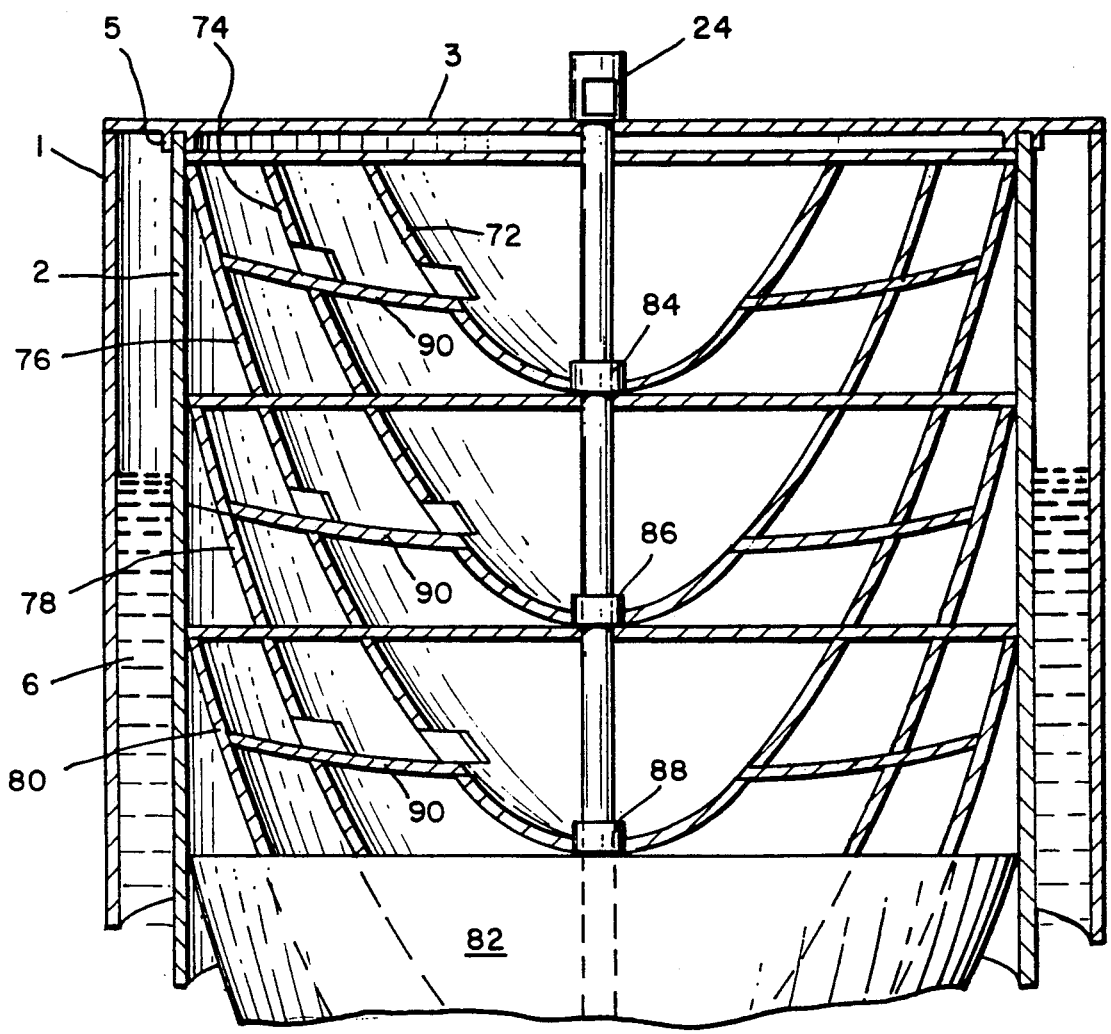
FIG. 4 is a front elevation out-away view of the top portion only of the present invention, particularly illustrating an alternate concentric arrangement of the paraboloid-shaped habitation levels.

FIG. 4 shows an example of yet another alternate habitation level arrangement for the GDCF called the "concentric" design. Each habitation level 76, 78, 80, 82 in the concentric design consists of several adjacent segments of the paraboloid defined by Equation 1, arranged concentrically with the habitat's axis of revolution, one within the next according to mean diameter. Thus, the habitation levels in this design may be constructed from those of the basic design by a process of vertical modulation, in which a habitation level from the basic design is cut through horizontally at regular intervals into sections of equal vertical span as illustrated for the top level sections 72, 74, 76 in FIG. 4. Horizontal partitions separate and support each level.

The concentric GDCF design has a greater inherent structural soundness than the other alternate designs, and makes the most efficient use of the interior volume of the habitat 2, and therefore of the vessel 1 and the facility in general. Access between the separated sections on a given level is accomplished via pseudohyperbolic floor sections 90 similar to the terraces used in the pseudohyperbolic terraced design.

Mathematically, a habitation level in a GDCF having the concentric design is characterized as follows. The height $c_n(r)$ at radius r of the living surface of the n'th concentric habitation level above the lower partition of that level is given by the polar function:

$$C_n(r) = b(r) \text{ modulo } s_n \quad \text{(Eqn. 5)}$$

where $b(r)$ = altitude at radius r of the living surface of a habitation level having the basic design above an imaginary basal plane tangent to the vertex of said living surface, meters (from Eqn. 1);

$s_n$ = vertical span between partitions of the n'th concentric habitation level, meters.

In this design, therefore, the height of the living surface above the lower partition of a given level is modulated by the vertical span of that level, being equal, that is, to the remainder generated when the height specified by $b(r)$ in Equation 1 is divided by the vertical span.

Design calculations for a GDCF having the concentric design shown in FIG. 4 with five levels result in the following dimensions for a Mars surface facility when the habitat revolution frequency, vertical segmentation and target zone coverage per level are the same as those in the embodiment of FIG. 1:

| Overall facility height: | 162 meters |
| Overall facility diameter: | 140 meters |
| Approx. total target (Earth) zone area: | 58,611 m$^2$ |

As in the terraced design illustrated by FIG. 2, more levels can be fit within a given vertical segment of the habitat using the concentric design than are possible with the basic design, and in this case the overall height of the facility is even less than that for an otherwise similar GDCF having the basic or terraced design. Hence, vertical modulation is another way of economizing on the total vertical dimension of each level without sacrificing target zone area. Access between levels is achieved using the central elevator 24, with stations 84, 86, 88 at the vertex of each level.

Other than as shown and described, all of the construction, operation and usage details for a GDCF having the concentric design shown in FIG. 4 are the same as those discussed earlier for the basic GDCF design.

The selection of the overall facility size and of the interior configuration of the habitat—basic, terraced, phased or concentric—depends on the primary application of the particular facility, as well as on considerations of cost and of the anticipated relative difficulty of construction. A GDCF may be installed and used anywhere and for any purpose wherein its particular attributes as a facility for generating acceleration magnitudes greater than the ambient acceleration present in the service environment are needed.

From the foregoing description, it is believed that the preferred embodiments each achieve the principal and subsidiary objects of the present invention. Alternative embodiments and modifications to those described herein will be apparent to those skilled in the art. These and other alternatives are considered to be equivalent and within the spirit and scope of the present invention.

Having described the invention, what is claimed is:

1. A facility for gravity differential conditioning comprising:
    (a) a vessel of sufficient size and integrity to contain and support a revolving habitat for human occupation along with the support and drive means of said habitat;
    (b) a revolving habitat within said vessel of sufficient interior volume for the support of human occupants;
    (c) means for supporting said habitat within said vessel;

(d) means for driving the revolution of said habitat within said vessel about a vertical axis;

(e) means for regulating the frequency of said revolution of said habitat;

(f) a plurality of habitation levels or living surfaces mounted within said habitat; said habitation levels being arranged symmetrically about said vertical axis of revolution of said habitat, and fixed at intervals down the height of said habitat; each said habitation level having a combination of overall diameter and frequency of said revolution as to generate on its upper/inner surface a given range of net acceleration magnitudes within the ambient vertical acceleration present in the operating or service environment of said facility; each said habitation level having a concave-up circular paraboloid shape or a shape derived from said paraboloid such that, in combination with the centripetal acceleration produced by the revolution of each said habitation level at a designated frequency about its axis of symmetry, together with the ambient vertical acceleration present in said operating environment, the directions of the local net acceleration vectors over those portions of the upper/inner surface of said habitation levels which are conformant to said paraboloid shape are generally orthogonal to said portions of said surface, providing a desired simulated gravitational force;

(g) means for permitting ingress to and egress from said facility; and (h) means for permitting access to, from and between said habitation levels.

2. The facility according to claim 1 wherein said vessel is cylindrical in shape and has a closed rigid top cap and a closed rigid base.

3. The facility according to claim 1 wherein said habitat is cylindrical in shape and has a closed rigid top cap and a closed rigid base.

4. The facility according to claim 1 wherein said habitat is mounted within said vessel upon a pivotal mount at bottom center of said habitat and within guiding means, said guiding means holding said habitat concentric within said vessel, and permitting said habitat to be revolved about its central longitudinal axis.

5. The facility according to claim 4 wherein said habitat is supported by passive hydraulic means within said vessel such that mechanical stress and friction at said pivotal mount and along said guiding means is minimized.

6. The facility according to claim 4 wherein said guiding means for said habitat includes a circular groove set in the underside of said vessel top cap; said groove incorporating within it a multiplicity of bearings located at intervals circumferentially, for the purpose of bearing on the circular top rim inner and outer surfaces of said habitat walls, permitting said habitat to be revolved about its central longitudinal axis while being held concentric within said vessel.

7. The facility according to claim 1 wherein said means for driving the revolution of said habitat includes a motor driving and rotating an array of swirling blades radially attached to said pivotal mount on the bottom inside surface of said vessel; an array of baffles attached radially to the underside of said habitat, and hydraulic fluid filling the space between said vessel and said habitat in sufficient quantity to effectively float said habitat within said vessel; said array of swirling blades being rotated and causing said hydraulic fluid to impinge on the surfaces of said array of baffles on said habitat in a rotary motion, thereby causing the revolution of said habitat on said pivotal mount and within said guiding means about its central longitudinal axis.

8. The facility according to claim 1 wherein said means for regulating the frequency of revolution of said habitat includes electronic frequency sensors attached to the inner surface wall of said vessel and the outer surface wall of said habitat; said frequency sensors monitoring the frequency of revolution of said habitat and transmitting signals to the controls of said motor driving said swirling blades, which maintains or adjusts the blade rotation speed as needed to maintain the selected habitat revolution frequency.

9. The facility according to claim 1 wherein each of a plurality of said habitation levels has a terraced concave-up circular paraboloid shape; said shape including one or more circular terraced areas incorporated in said paraboloid shape in a manner so as to reduce the overall habitat height requirement and/or so as to increase the number of habitation levels that can be fit within a given habitat height.

10. The facility according to claim 9 wherein each of a plurality of said circular terraces has a concave-up circular pseudohyperbolic shape such that the angle between its upper/inner surface and the directions of the local net acceleration vectors is invariant over said upper/inner surface, both radially and circumferentially.

11. The facility according to claim 1 wherein the uppermost of said habitation levels are arranged in a phased manner, having successively smaller diameters proceeding upward from the uppermost full-sized level; said phased habitation levels each being concentric with the central longitudinal axis of said habitat; said phased habitation levels being useful for facility occupants who should be restricted from exposure to the greater accelerations obtaining in the full-sized levels; said phased habitation levels providing practical use of the open space above the uppermost full-sized level, thereby making more efficient use of the internal volume of said habitat.

12. The facility according to claim 1 wherein each of a plurality of said habitation levels is configured in accordance with the concentric design; each said concentric habitation level being constructed from the corresponding concave-up circular paraboloid shape by a process of vertical modulation, in which said paraboloid shape is divided horizontally at regular intervals into sections of equal vertical span; said sections being arranged concentrically with the habitat axis of revolution, one within the next according to mean diameter; adjacent such concentric habitation levels being separated by horizontal partitions; access between said sections of each said concentric habitation level being achieved through sections of curved terraces having a concave-up pseudohyperbolic shape; said concentric habitation level design making possible the largest usable living surface area per unit of habitat volume.

13. The facility according to claim 1 wherein said means for ingress to and egress from said facility, and for access to, from and between said habitation levels includes a central elevator system; said elevator system comprising a shaft concentric with the central longitudinal axis of said facility, an having a lifting a lifting cable means for operating and lifting said car, and elevator stops or stations located at the vertex of each said habitation level; said elevator shaft extending above the top of said facility to permit ingress to and egress from said facility.

14. The facility according to claim 13 wherein said elevator shaft is fixed to each said habitation level so that said shaft rotates with said habitation levels; said elevator stops being recessed outward so as to ease transitions by facility users between said elevator car and each said habitation level.

15. The facility according to claim 13 wherein said elevator car is attached to its lifting cable by means of a pivoting joint, permitting said elevator car to be spun up for access to said habitation levels, and spun down for embarkation and debarkation at said facility entrance.

16. The facility according to claim 13 wherein said elevator shaft is fixed to said vessel and thus not attached to said habitation levels, comprising a simpler albeit less flexible elevator design.

17. A process method for gravity differential conditioning of individuals wishing to transfer from an environment of weaker gravity to an environment of stronger gravity; said process method utilizing a gravity differential conditioning facility (GDCF) which is located within said CA environment of weaker gravity, said GDCF incorporating a plurality of habitation levels which revolve about a vertical axis of revolution, said habitation levels being formed from concave-up circular paraboloids which produce a characteristic of zero incremental local net vertical acceleration magnitude at said paraboloid surface vertex area located near its axis of revolution, and increasing higher local net vertical acceleration at each increasing surface radius zone; each said habitation level having a radial area of its surface with an acceleration magnitude simulating a gravity environment to within plus or minus ten percent of a desired gravity environment, said radial area being designated a target zone; and comprising the steps of:
 (a) entering the facility, proceeding to a habitation level and remaining near the vertex area for a short time;
 (b) moving out to a radial zone of incrementally higher local net acceleration magnitude and remaining there for a designated period;
 (c) moving gradually outward from the vertex area through zones of increasing local net acceleration magnitude, stopping at each zone for a designated period until reaching the target zone corresponding to the target or destination environment's native acceleration;
 (d) remaining within or about the target zone until judged physiologically ready for transition to the target environment;
 (e) exiting the habitation level and the facility.

18. A process method for gravity differential conditioning of individuals wishing to transfer from an environment of stronger gravity to an environment of weaker gravity; said process method utilizing a gravity differential conditioning facility (GDCF) which is located within said environment of weaker gravity, said GDCF incorporating a plurality of habitation levels which revolve about a vertical axis of revolution, said habitation levels being formed from concave-up circular paraboloids which produce a characteristic of zero incremental local net vertical acceleration magnitude at said paraboloid surface vertex area located near its axis of revolution, and increasing higher local net vertical acceleration at each increasing surface radius zone; each said habitation level having a radial area of its surface with an acceleration magnitude simulating a gravity environment to within plus or minus ten percent of a desired gravity environment, said radial area being designated a target zone; and comprising the steps of:
 (a) entering the facility after arriving at the environment of weaker gravity, proceeding to a habitation level and moving directly outward from the vertex of the level to the target zone corresponding to the stronger gravity environment of origin and remaining there for a designated period;
 (b) moving gradually inward through zones of decreasing local net acceleration magnitude toward the vertex of the level, stopping at each zone for a designated period;
 (c) entering the vertex area of the habitation level and remaining thereabouts until comfortable in, and/or judged physiologically ready for transition to the external native gravity environment;
 (d) exiting the habitation level and the facility.

19. A process method for gravity differential conditioning of individuals wishing to visit an environment of weaker gravity from and/or en route to an environment of stronger gravity; said process method utilizing a gravity differential conditioning facility (GDCF) which is located within said environment of weaker gravity, said GDCF incorporating a plurality of habitation levels which revolve about a vertical axis of revolution, said habitation levels being formed from concave-up circular paraboloids which produce a characteristic of zero incremental local net vertical acceleration magnitude at said paraboloid surface vertex area located near its axis of revolution, and increasing higher local net vertical acceleration at each increasing surface radius zone; each said habitation level having a radial area of its surface with an acceleration magnitude simulating a gravity environment to within plus or minus ten percent of a desired gravity environment, said radial area being designated a target zone; and comprising the steps of:
 (a) entering the facility after arriving at the environment of weaker gravity, proceeding to a habitation level and moving gradually or directly outward from the vertex of the level to the target zone corresponding to the stronger gravity environment of origin or of subsequent destination and remaining there for a designated period;
 (b) taking up residence in the target zone corresponding to the gravity environment of origin or of subsequent destination;
 (c) moving gradually inward through zones of decreasing local net acceleration magnitude toward the vertex of the level, stopping at each zone for a designated period;
 (d) entering the vertex area of the habitation level and remaining there until comfortable in, and/or judged physiologically ready for transition to the external native gravity environment;
 (e) periodically exiting the habitation level and the facility if necessary for the purpose of the visit;
 (f) remaining within or periodically returning to the facility and a target zone corresponding to the stronger gravity environment of origin or of subsequent destination for meals, sleep, exercise and leisure activities;
 (g) quitting residence in the facility and proceeding to the stronger gravity environment of origin or of subsequent destination.

20. A process method for gravity differential conditioning of individuals undergoing physical therapy, athletic conditioning or other physical training not necessarily related to space travel; said process method utilizing a gravity differential conditioning facility (GDCF), said GDCF incorporating a plurality of habitation levels which revolve about a vertical axis of revolution, said habitation levels being formed from concave-up circular paraboloids which produce a characteristic of zero incremental local net vertical acceleration magnitude at said paraboloid surface vertex area located near its axis of revolution, and increasing higher local net vertical acceleration at each increasing surface radius zone; each said habitation level having a radial area of its surface with an acceleration magnitude simulating a gravity environment to within plus or minus ten percent of a desired gravity environment, said radial area being designated a target zone; and comprising the steps of:

(a) entering the facility, proceeding to a habitation level and moving gradually or directly outward from the vertex of the level to a target zone within which the magnitudes of the local net acceleration vectors are appropriate for the desired therapy, conditioning or training regimen;

(b) remaining in said target zone for a designated period, exercising and resting as prescribed for the particular regimen;

(c) exiting the habitation level and the facility;

(d) periodically returning to the facility and an appropriate target zone for continued therapy, conditioning or training.

* * * * *

UNITED STATES PATENT AND TRADEMARK OFFICE
CERTIFICATE OF CORRECTION

PATENT NO. : 5,302,130
DATED : April 12, 1994
INVENTOR(S) : David L. Sieving

It is certified that error appears in the above-indentified patent and that said Letters Patent is hereby corrected as shown below:

Column 14, claim 13, lines 65 and 66:

"an having a lifting a lifting cable means for operating and lifting said car," to read --an elevator car having a lifting cable,--.

Signed and Sealed this

Thirtieth Day of August, 1994

Attest:

BRUCE LEHMAN

*Attesting Officer*    *Commissioner of Patents and Trademarks*